US010252780B2

(12) United States Patent
Godøy

(10) Patent No.: US 10,252,780 B2
(45) Date of Patent: Apr. 9, 2019

(54) FAIRING FOR REDUCING THE FLOW RESISTANCE

(71) Applicants: POLARCUS DMCC, Dubai (AE); Erik Godøy, Nesbru (NO)

(72) Inventor: Erik Godøy, Nesbru (NO)

(73) Assignee: POLARCUS DMCC, Dubai (AE)

( * ) Notice: Subject to any disclaimer, the term of this patent is extended or adjusted under 35 U.S.C. 154(b) by 0 days.

(21) Appl. No.: 15/526,804

(22) PCT Filed: Nov. 23, 2015

(86) PCT No.: PCT/NO2015/050220
§ 371 (c)(1),
(2) Date: May 15, 2017

(87) PCT Pub. No.: WO2016/118017
PCT Pub. Date: Jul. 28, 2016

(65) Prior Publication Data
US 2017/0334526 A1 Nov. 23, 2017

(30) Foreign Application Priority Data

Nov. 27, 2014 (NO) .................................. 20141428

(51) Int. Cl.
F15D 1/10 (2006.01)
B63B 21/66 (2006.01)
G01V 1/38 (2006.01)

(52) U.S. Cl.
CPC .............. B63B 21/663 (2013.01); F15D 1/10 (2013.01); G01V 1/3826 (2013.01); B63B 2241/10 (2013.01)

(58) Field of Classification Search
CPC ........................... B63B 21/663; B63B 2241/10
See application file for complete search history.

(56) References Cited

U.S. PATENT DOCUMENTS 3,233,571 A * 2/1966 Rather .................. B63B 21/663
114/243
3,352,274 A * 11/1967 Clakins .................. B63B 21/663
114/243

(Continued)

FOREIGN PATENT DOCUMENTS

FR 2540822 8/1984
FR 2540822 A1 * 8/1984 ........... B63B 21/663

(Continued)

OTHER PUBLICATIONS

Norwegian Search Report issued in Norwegian application No. 20141428, dated Mar. 7, 2015, pp. 1-2.

(Continued)

Primary Examiner — Lars A Olson
Assistant Examiner — Jovon E Hayes
(74) Attorney, Agent, or Firm — Jeffrey S. Melcher; Melcher Patent Law PLLC

(57) ABSTRACT

A cable fairing (fairing) (40) for reducing the flow resistance for a cable (45) has a wing formed cross section with a wide, rounded front and a tapered tail, a through-going cable channel (46) for the cable (45) perpendicular to the cross section of the widest part of the cross section. The wing profile comprises an elastic material of sufficient stiffness to maintain the shape when it is towed thereby causing flow resistance. The cable fairing (40) has slots (42) cut into the elastic material from the tail towards the cable channel (46), so that the tail comprises slats (41) which can be bent parallel to the cable channel (46) to reduce the cross-section of the cable fairing. By this is low flow resistance, as from a stiff cable jacket, combined with sufficient elastic deformability so the cable (45) with attached cable fairings (40), can be winched and pass through narrow openings in the (Continued)

deployment and retrieval, and wound onto a reel for storage and transport.

14 Claims, 4 Drawing Sheets

(56) References Cited

U.S. PATENT DOCUMENTS

| | | | | |
|---|---|---|---|---|
| 3,611,976 | A * | 10/1971 | Hale | B63B 21/663 114/243 |
| 3,962,982 | A * | 6/1976 | Marchay | B63B 21/663 114/243 |
| 4,075,967 | A * | 2/1978 | Silvey | B63B 21/663 114/243 |
| 4,474,129 | A * | 10/1984 | Watkins | B63B 21/663 114/243 |
| 4,567,841 | A * | 2/1986 | Hale | B63B 21/663 114/221 R |
| 4,829,929 | A * | 5/1989 | Kerfoot | B63B 21/663 114/243 |
| 4,836,122 | A * | 6/1989 | Henderson | B63B 21/663 114/243 |
| 5,456,199 | A * | 10/1995 | Kernkamp | B63B 1/32 114/111 |
| 6,244,204 | B1 * | 6/2001 | Weyman | B63B 21/663 114/243 |
| 8,851,005 | B2 * | 10/2014 | Tonchia | G01V 1/38 114/243 |
| 9,791,582 | B2 * | 10/2017 | Martin | B63B 21/663 |
| 2017/0334526 | A1 * | 11/2017 | Godoy | B63B 21/663 |

FOREIGN PATENT DOCUMENTS

| | | | |
|---|---|---|---|
| WO | 84/02890 | 8/1984 | |
| WO | WO-2016118017 A1 * | 7/2016 | B63B 21/663 |

OTHER PUBLICATIONS

International Search Report issued in parent international application No. PCT/NO2015/050220, dated Apr. 2, 2016, pp. 1-2.

* cited by examiner

Fig. 1 (Prior art)
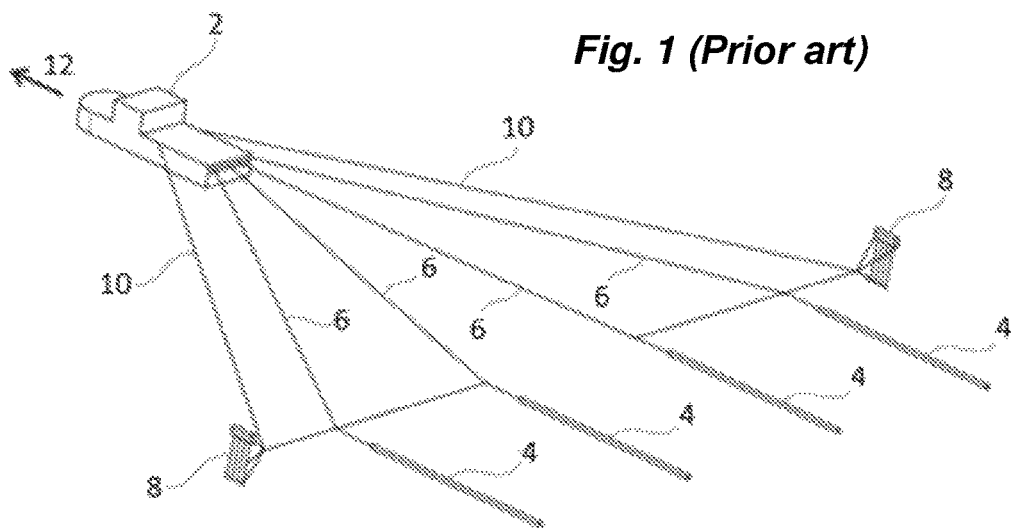
Fig. 2 (Prior art)
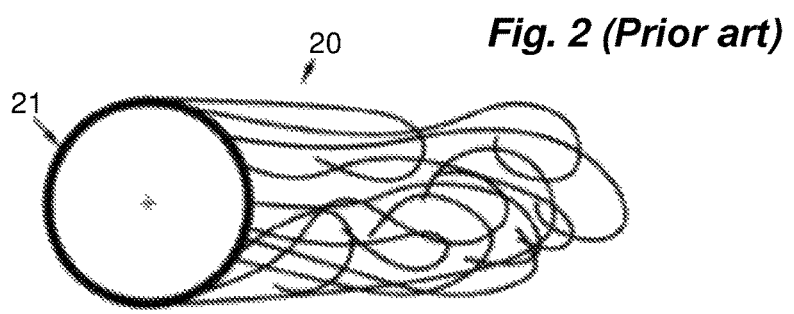
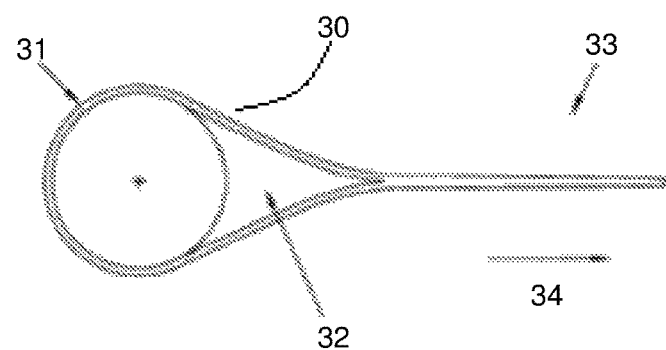
Fig. 3 (Prior art)

FAIRING FOR REDUCING THE FLOW RESISTANCE

FIELD OF INVENTION

The invention relates to a cable fairing for reducing the flow resistance of a cable towed through the water across its longitudinal direction.

KNOWN AND RELATED ART

In a number of applications a cable, a rope or equivalent is towed through the water across the length direction of the cable or robe. One example is the marine seismic investigations where long, parallel streamers are towed substantially in the longitudinal direction of the streamers, while the ropes and cables that keep the distance between the streamers are towed across their longitudinal direction. Another example is towing of submerged structures where the streamer extends vertically through the water from a tugboat on the surface.

In the following description and the claims, the term "cable" is used for practical reasons on any flexible elongate member towed through the water more or less transversely to the longitudinal direction. It is thus understood that the "cable" used her comprises chain, wire rope, synthetic rope, communication cables, power cables, etc.

When an object is towed through a liquid, the towing resistance is increased with increasing towing speed. The towing speed in seismic exploration is typically 5 knots, but the invention is not limited to use just under these speeds. As previously described the total towing resistance for a larger cable configuration may be up to 800 to 1000 kN at 5 knots. A significant part of the towing resistance is related to cables and ropes towed approximately perpendicularly through the water. However, towing resistance can be reduced significantly by the use of cable fairings, English fairings, mounted on cables and ropes. A cable fairing is here a mechanical device used to reduce the hydrodynamic resistance forces that occur when the cable is subjected to a liquid stream, which is fully or partially perpendicular to the cable.

Cable fairings can be divided into two main groups. The first group comprises relative rigid covers or fairings which maintain a fixed streamlined shape when subjected to flow resistance. The other group comprises flexible ribbons or fibres, which comply with the flow behind the cable when towing, and is attached to the cable with a ring.

Rigid cable fairings give less flow resistance compared to those with ribbons or fibres. For example, the resistance coefficient of a streamlined wing profile is typically in the range 0, 05-0, 30, while the resistance coefficient for a circular cross-section typically is in the range 1.00-2.00. A reduction of the towing resistance by a factor of between 5 and 20 is thus effectively obtainable with a rigid fairing cable. The disadvantage of rigid cable fairings is that they simply cannot be wound up on a drum, and they cannot pass through narrow passages during release and retrieval.

Cable fairings with ribbons or fibres have for comparison a higher resistance coefficient, typically in the area of 0.70-1.00. Thus the flow resistance becomes greater and the reduction of the towing resistance therefor less compared to a wing profile with more rigid and more stable construction. In return, ribbons and fibres can easily be winched, stored on drums and drawn through narrow passages during storage, release, and retrieval of the cable.

U.S. Pat. Nos. 3,176,646 and 3,611,976 describe cable fairings where the necessary pliability or flexibility is obtained by the cable fairing being divided into relative short sections. Joints formed between each section allows the assembly to be bent.

Norwegian patent NO 325427 describes a cable fairing made by an elastic plastic material that allows bending of the assembly.

From US 2004/0035349 a cable fairing is known which combines the advantages by flexible and rigid cable fairings. The cable fairing is made of a material making the cable fairing stiff enough to achieve the superior hydrodynamic performance of rigid cable fairings, but is sufficient flexible in order to be wound on a reel without being damaged.

Common for the solutions mentioned above is that they provide a cable fairing that allow longitudinal bending of the elements, but they do not allow elastic deformation of the cable fairing in other directions or other plane. Such elastic deformation may be required if one cable or a rope with attached cable fairing is to be drawn through a passage which is smaller than the cross section of the cable fairing.

By known technology, such flexibility in all directions/all levels is achieved only if cable fairing with ribbons or fibres in the form of thin-walled profiles made of a resilient plastic or rubber material as shown in FIG. 3 are used. The disadvantage of these solutions is that they provide a higher resistance coefficient than a wing profile that maintains its shape during towing through the water.

The purpose of the present invention is to provide a cable fairing having the superior reduction of the flow resistance of the rigid cable fairing during towing, and simultaneously can pass through narrow openings and rolled up on a drum.

SUMMARY OF THE INVENTION

The purpose of the invention is achieved by a cable fairing as specified in claim 1.

More specifically, the invention comprises a cable fairing for reducing flow resistance to a cable said cable fairing has a wing shaped cross section with a broad, rounded front and a tapered tail and a through-going cable channel for the cable perpendicular to the cross section of the widest part of the cross section. The wing profile comprises an elastic material with sufficient stiffness in order to maintain the shape when it is exposed to a flow resistance. The cable fairing is characterized in slits cut into the resilient material from the tail towards the cable channel, so that the tail comprises slats that can be bent parallel to the cable channel to reduce the cross-section of the cable fairing.

When towing the wing profile is maintained. The differential pressure across the cross-section changes the shape a little or not at all when the elastic material is sufficiently rigid. Thus, there can be selected materials having sufficiently high modulus of elasticity to restrict the deflection to a predetermined limit, so that a desired reduction of the flow resistance is achieved. When the cable fairing is dragged through narrow passages or bent over a winch, or spooled onto a reel, the slats will be displaced in relation to each other and bent so that cable fairing can pass or be bent.

In a preferred embodiment, the cable channel has a larger diameter than a cylindrical envelope around the cable. Thereby the cable fairing may rotate freely around the cable and adjust to that so the flow resistance is minimized.

Preferably, the cable channel has a cylindrical slide bearing in each end. The purpose is to reduce the friction or the abrasion of the elastic material. Therefore, the slide bearing is preferably made of metal, hard plastic or similar. The expression "in each end" is meant to cover the possibility for one sleeve running through the entire channel and two short connecting pieces, one in each end of the cable channel.

In a preferred embodiment, the slide bearing is extended axially out of the cable channel. The purpose is to keep the cable fairings a little from each other, i.e. so they can rotate freely around the cable independent of each other. The desired axial distance between the cable fairings can be obtained by providing the entire extension on one side of the cable fairing, allocate the extension with an equal amount on either side and any distribution between the two preceding ones. A radial expansion to a flange is also possible.

In some embodiments, the cable fairing may have a through-going channel extending in the longitudinal direction of the cable fairing parallel to the cable channel. One or more such channels may increase the flexibility in several directions, but it must be considered that the cable fairing must maintain the wing profile during towing in order to achieve the desired reduction of the flow resistance.

The distance between the front and the outermost part of the tail is preferably 2 to 6 times the diameter to the cable channel. Exact shape of the wing profile depends partly on the desire of minimal flow resistance, and partly on the equipment used for release, storage and retrieval.

The distance between the slits, and the width and depth of the slits are adapted to the size and the outward curve of the cable faring that is desired to be obtained. Therefor the slits are extending preferably between 20% and 70% of the cross-sectional longitudinal direction. This is believed to provide sufficient freedom of movement so that the slats can be bent and displaced by elastic deformation, i.e. so that they return to the position in a wing profile when shear forces decrease, for example by tow.

In the same way the width of the slits and slats is adapted to the actual application e.g. so the width of the slits is between 0.1 and 5 mm and the width of the slats is between 5 and 40 mm for common cable diameters and sizes of the cable fairings.

The cable fairing can be made by any suitable synthetic or natural elastomer or rubber, e.g. from the group comprising: heat-curing polyurethane, thermoplastic polyurethane, styrene block copolymers, polyolefin, elastomeric alloys, thermoplastic copolyester, thermoplastic polyamides, natural rubber, nitrile rubber, hydrogenated nitrile rubber (HNBR), butyl rubber, styrene butadiene rubber and neoprene.

SHORT DESCRIPTION OF THE FIGURES

In the following the invention is described in detail using an exemplary embodiment with reference to the accompanying drawings, where:

FIG. 1 shows a typical configuration of sensor cables in a marine seismic investigation, FIG. 2 shows a cable fairing with ribbon or fibres from the prior art;

FIG. 3 shows a flexible cable fairing with thin resilient walls from the prior art

Figure 6:
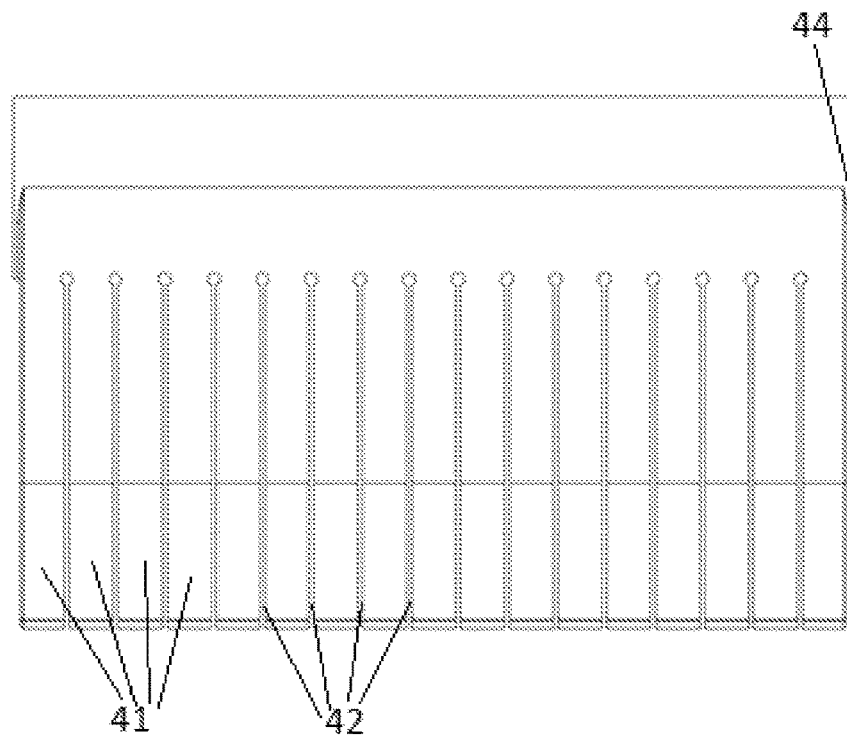
FIG. 6 is a plan view of the cable fairing of the FIGS. 4 and 5.
Figure 7:
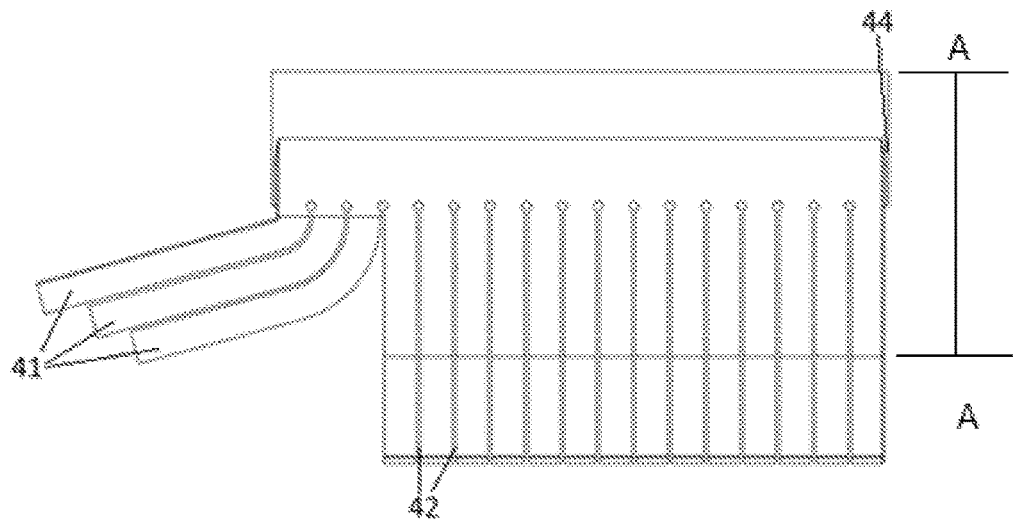

FIG. 7 corresponds to FIG. 6 with slats in the flexed position, and

Figure 8:
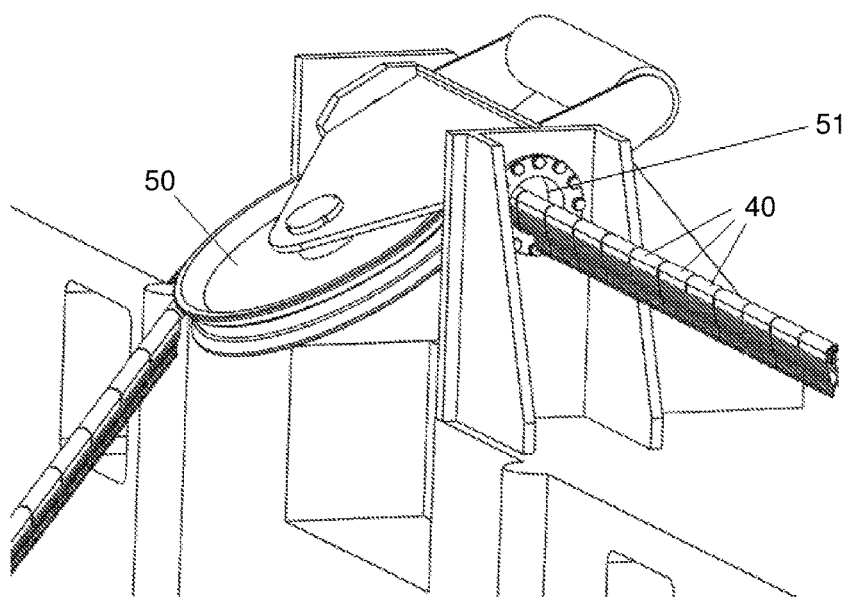

FIG. 8 illustrating handling of a cable fairing during release and retrieval.

DETAILED DESCRIPTION

The figures are only meant as an illustration of the invention. Therefore, they are not necessarily to scale and a number of details, which are obvious to one skilled in the art, are omitted for the sake of clarity.

FIG. 1 (prior art) illustrates a seismic survey vessel 2 which is pulling several parallel streamers or streamers 4 in the direction shown with an arrow 12. Each streamer 4 is connected to the vessel 2 through a cable 6, for instance a steel tow with associated communication lines and optionally power supply. The streamers 4 are spread laterally with the help of paravanes 8, in such a way that the cables 6 are spread in a fan shape behind the vessel 2. The paravanes 8 are dragged by own towing wires 10. Cables across the towing direction 12 can help keeping the streamers 4 evenly spaced apart as illustrated with the transverse cables from the paravanes 8. Those transvers cables are dragged through the water substantially perpendicular to their longitudinal direction, while the cables 6 and 10 receive a force component perpendicular to the longitudinal direction which can also contribute significantly to the towing resistance.

FIG. 2 (prior art) shows a cable fairing with ribbons or fibres 20 and a ring 21 adapted to the cable. This type of cable fairings provides greater flow resistance than a rigid wing, but the flexible ribbons or fibres make it easy to pull the cable through narrow openings and store it on a drum.

FIG. 3 (prior art) shows a cable fairing with thin elastic walls 30 and a ring 31 to be attached to a cable. The thin, elastic walls 30 and the ring 31 form a cavity 32. The object has a relatively long, thin tail 33 which can be bent out at small pressure differences, here illustrated with a right flow speed 34 on one side of the fairing. Such higher flow speed reduces the dynamic pressure on the side with the greatest flow speed. Thus, the tail 33 swings toward the direction with the greatest speed, so that the flow path on the opposite side is prolonged, the flow speed on the opposite side increases, and the tail 33 turns in the opposite direction.

The work performed on the cabal fairings in FIGS. 2 and 3 are reducing the efficiency compared to a rigid cabal fairing not using energy for an elastic deflection and/or increased adhesion in the boundary layers against the ribbon or fibre.

Figure 4:
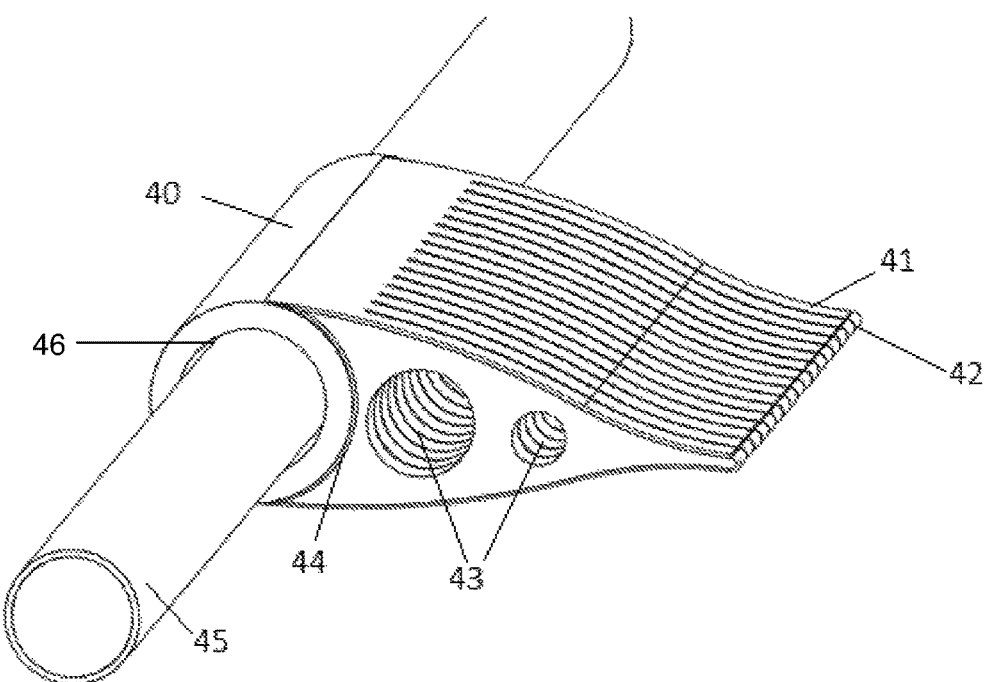
FIG. 4 is a cross section of a cable fairing according to the invention mounted on a cable.

FIG. 4 shows a cable fairing 40 according to the invention mounted on a cable 45. More such cable fairings 40 are placed along all of or part of the cable 45.

The cable fairing 40 has substantially a streamlined wing profile with a rounded front and a tapering tail. A through-going cable channel 46 adapted to the cable 45 extends perpendicularly to the chord direction from the front to the tail. Thus, the cable channel 46 for the cable 45 is perpendicular to a wing-shaped cross section in the widest part of the cross section. The tail is divided into slats 41 by slits 42 cut from the tail in the direction towards the cable channel 46.

The material in the wing profile is elastic but has sufficient stiffness for maintaining the shape shown in FIG. 4 when it is towed through the water. Thus, the cable fairing 40 has substantially the same characteristics as a rigid cable fairing when it is towed through the water.

When the cable 45 is towed across the water the cable fairing 40 must be aligned with the rounded front against the flow, and the tail is directed backwards in the opposite direction of the towing direction. When the cable 45 is towed so that the longitudinal direction forms an angle with the direction of travel, for example as the cables 6 and 10 in FIG. 1, a cable fairing 40 can reduce the resistance. If the cable 45 is towed parallel to the direction of travel, for example as the streamers 4 in FIG. 1, the increased area of the cabal fairing 40 will increase the flow resistance. Thus, there is an angle between 0 and 90° from the direction of travel in which a cabal fairing 40 begins to reduce flow resistance. This angle partly depends on the form and tow speed of the wing profile, and must be determined by those skilled in the art in each application.

Independent of the angle between the cable 45 and the velocity vector, the cable channel 46 therefor has a preferably larger diameter than a cylindrical envelope around the cable 45, so that cabal fairing 40 is free to rotate about the cable 45.

In a non-limiting example of an embodiment adapted to a cable having a 40 mm diameter the cable channel 46 has an inner diameter of 44 mm, the cabal fairing 40 has a largest thickness, i.e., the greatest width of the cross section, equal to 60 mm and a chord length 175 mm. In this example, the slits are parallel and perpendicular to the cable channel. Slits extending 115 mm from the tail end, are 1.5 mm wide, forming slats with a width of 14.5 mm. The thickness at the tail is 5 mm. FIG. 4 shows 17 slats 41, and the length of the wing profile parallel to the cable 45 is thus 270.5 mm. In addition, the slide bearing 44 is in this embodiment extended by 2.25 mm from the wing profile at both ends, so that cable fairing 40 of this example has a total length 275 mm. The extension of the slide bearing 44 can rotate relatively to the corresponding elongation of the neighbour fairings so that the slats 41 are not hooked together and so that each cable fairing 40 is free to rotate around cable 45.

In order to reduce the weight and/or to improve the elastic deformation property for the cable fairings 40, one or more through-going channel(s) 43 along the cable fairing 40 can be formed. In the FIGS. 4 and 5 two such channels 43 are shown running parallel to the cable channel 46. The channel(s) 43 may have other shapes than a straight cylinder but it must be ensured that the walls of the channels are sufficiently thick to maintain the desired wing profile during towing.

Figure 5:
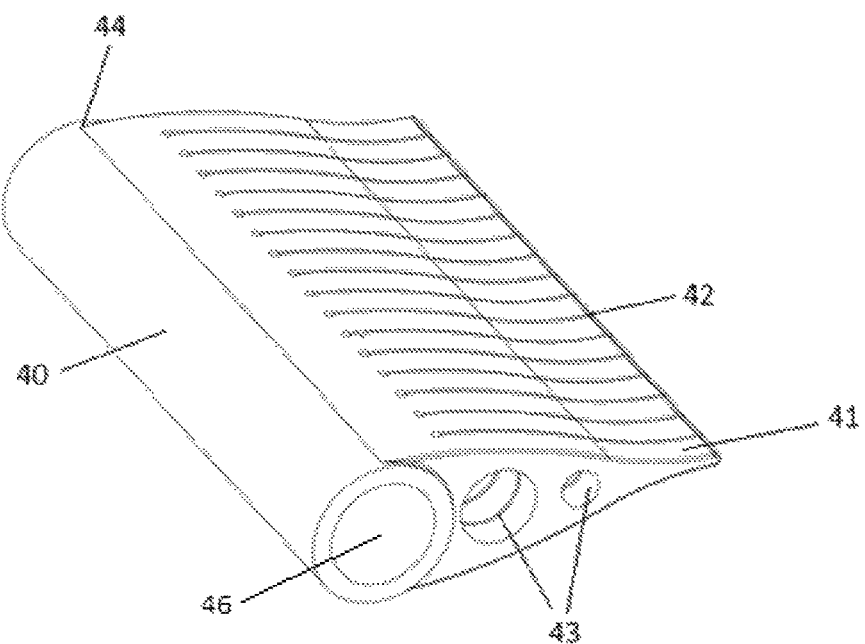
FIG. 5 is a perspective view of the cable fairing according to the invention.

FIG. 5 shows the cable fairing 40 from FIG. 4 shown from another angle. In the shown embodiment, the cable channel 46 is an inner room in a sleeve 44, for example made by a relatively hard and hardwearing thermoplastic, and an elastic wing profile is attached to the sleeve by gluing, welding or other known technology. The specific choice of material for the sleeve 44 depends in this embodiment on the sleeve length, how flexible it must be in the appropriate application etc. As indicated above, the wing profile may alternatively be made as one piece of an elastic material having a through-going bore as a cable channel 46 for the cable 45, and for instance a slide bearing 44 in the form of a connection piece with radial flanges of metal or hard plastic. The concrete structure is left to the skilled person with knowledge of the relevant application.

FIG. 6 is a plan view of the cable fairing in the FIGS. 4 and 5 that clearly shows the slats 41, the slits 42 and the extension of the cable channel 44 compared to the elastic wing profile. FIG. 6 illustrates the first of two specific important purposes with the invention that is to reduce the towing resistance through the water. For this, it is desirable that the wing profile has a minimum area in the direction of travel, i.e. the cross section of the wing profile in the direction perpendicular to the cable channel and the paper plan in FIG. 6 is as narrow as possible. It corresponds to, in the embodiment of FIGS. 4-7, that the outer diameter of the slide bearing 44, which here is shaped like a cylindrical sleeve, is minimized when taking into consideration that the sleeve 44 must be able to rotate freely around the cable and also to have the necessary strength. The cable fairing 40 must also have a certain shape stability to provide desirable hydrodynamic characteristics. Experience shows that the wall thickness should be at least 5% of the height of the cable fairing 40, more preferably at least 10% of the height of the cable fairing 40, and preferably about 15% of the height of the cable fairing 40 to provide sufficient strength and dimensional stability.

Optimal chord length, i.e. the optimal distance from the front at the top of FIG. 6 to the outermost part of the tail at the bottom in FIG. 6, depends on the tow speed. At low towing speeds laminar appendages will often dominate, so that a relatively short chord length is optimal. At higher speeds, a longer wing profile may counteract whirls behind the cable fairing. In conventional tow crossings, a chord length of about 2-6 times the diameter of the cable channel, i.e. a little over 2-6 times the cable diameter is expected to be optimal. The length and the rest of the wing profile should be adapted to the actual application e.g. with hydrodynamic calculations and/or attempt in a known manner.

FIG. 6 also shows that the slits 42 extend through the elastic wing profile from the tail toward the sleeve 44, but not all the way. Depending on the chord length, this will typically comprise from 20% of a short profile to 70% of a long profile. The slits 42 have a defined width, for example between 0.1 and 5 mm at the most actual cable diameter with associated cable fairings 40. The width of the slits 42, i.e. the distance between the slats 41, is adapted so that the slats 41 can be bent with ease. Similarly, the width of the slats 41 is adapted to the material of and the size of the cable fairing. Typical widths for the dimensions in the above examples is between 5 and 40 mm.

FIG. 7 corresponds to FIG. 6 but shows some slats 41 bent parallel to the sleeve 44, and thus parallel to the cable channel 46 according to the independent claim 1. Thus FIG. 7 illustrates the second of two particularly important purposes of the invention, namely to provide a cable fairing which is sufficiently flexible to allow the cable 45 with attached cable fairings 40 to be winched and pass through narrow openings by release and retrieval, and which can be wound on to the drum during storage and transport. Segment A-A illustrates new dimension after deformation. It is understood that the deformation in all cases is elastic, meaning that the deflected slats 41 return to the positions shown in FIG. 6, when shear forces, i.e. external forces across the longitudinal direction of the slats, do not affect them.

FIG. 8 shows a detail of the equipment used by the deployment and retrieval by a cable with mounted cable fairings 40. More specifically, the cable is extended over a pulley 50, and must therefore be flexible. In addition, the cable is passed through a passage 51 that is too narrow to allow the rigid cable fairings to pass.

Cable fairings 40 of the present invention is thus formed of a material that is rigid enough to achieve favorable hydrodynamics, i.e. with a resistance coefficient that is comparable to the resistance coefficient of a rigid cable fairing. At the same time, the material is elastic enough to resume its original shape quickly after being deformed, for example drawn through an orifice of small cross section 51, or been reeled onto a drum together with the cable 45, which the cable fairings 40 are attached to.

The materials used in cable fairings 40 according to the invention have preferably a density of between about 1 000 and 1 300 kg/m³, preferably between about 1 000 and 1 200 kg/m³. Moreover, materials have a hardness between about 60 and 100 Shore A, preferably between 65 and 95 Shore A. The materials have a tensile strength at room temperature between 15 and 50 MPa, preferably between 20 and 40 MPa, and an elongation at break at room temperature between 300 and 900%, preferably between 400 and 800%.

Preferred materials in this connection are polymer materials or rubber materials. Polymer materials which may be used are mainly synthetic and natural elastomers, among these thermoplastic elastomers (TPE). From the group of thermoplastic materials is polyurethanes suitable both thermo cured polyurethanes, thermoplastic polyurethanes. It may also be other thermoplastic elastomers, styrene block copolymers (TPE-s), polyolefin blender (TPE-O), elastomeric alloys (TPE-V or TPV), thermoplastic polyester and thermoplastic polyamides. Rubber materials that may be used are natural rubber, hydrogenated nitrile rubber (HNBR), butyl rubber, styrene butadiene rubber, nitrile rubber and neoprene (polychloroprene).

The diameter for a typical cable 45 is normally between 10 and 70 mm, often between 20 and 50 mm, but also bigger and smaller cross-sections may be used. The size of the wing profiles may obviously be adapted to the actual application for instance as mentioned above.

The shape of the wing profile may advantageously be adapted to the actual towing speed, i.e. both speed and direction, with calculations or experiments that are known in the art. Typical towing speeds are about 5 knots, but also lower and higher towing speeds occur. It is also thinkable to adapt the shape of the cabal fairing to the direction of travel, for example using various forms of cable fairings for towing cables 6, paravene wires 10 and cross-cables from paravane 8 as they are shown in FIG. 1.

Although the invention is described with reference to a specific embodiment shown in the drawings, it is clear to a skilled person that the invention is not limited to this. The invention is defined in the appended patent claims.

The invention claimed is:

1. A cable fairing for reducing the flow resistance to a cable, said cable fairing has a wing shaped cross section with a broad, rounded front and a tapered tail, a through-going cable channel for the cable perpendicular to the cross section of the widest part of the cross section, where the wing profile comprises an elastic material with sufficient stiffness in order to maintain the shape when it is exposed to a flow resistance, wherein slits are cut through the resilient material from the tail towards the cable channel, so that the tail comprises slats separated by the slits and each slat can be independently bent parallel to the cable channel to reduce the cross-section of the cable fairing.

2. The cable fairing according to claim 1, wherein the cable channel has a larger diameter than a cylindrical envelope around the cable.

3. The cable fairing according to claim 2, wherein the cable channel comprises a cylindrical slide bearing in each end.

4. The cable fairing according to claim 3, wherein the slide bearing is extended axially out of the cable channel.

5. The cable fairing according to claim 1, further comprising a through-going channel extending in the longitudinal direction of the cable fairing parallel to the cable channel.

6. The cable fairing according to claim 1, wherein the distance between the front and the outermost part of the tail is 2 to 6 times the diameter to the cable channel.

7. The cable fairing according to claim 1, wherein the slits extend between 20% and 70% of the cross-sectional longitudinal direction.

8. The cable fairing according to claim 1, wherein the width of the slits is between 0.1 and 0.5 mm.

9. The cable fairing according to claim 1, wherein the width of the slats is between 5 and 40 mm.

10. The cable fairing according to claim 1, wherein the elastic material is chosen from the group comprising heat-curing polyurethane, thermoplastic polyurethane, styrene block-copolymer, polyolefin, elastomeric alloys, thermoplastic copolyester, thermoplastic polyamides, natural rubber, nitrile rubber, hydrogenated nitrile rubber (HNBR), butyl rubber, styrene butadiene rubber and neoprene.

11. The cable fairing according to claim 1, wherein the resilient material is elastic enough to resume an original shape after being deformed.

12. The cable fairing according to claim 11, wherein the resilient material is elastic enough to resume an original shape after being deformed by drawing the cable fairing through an orifice of small cross section or reeling the cable fairing onto a drum together with a cable to which the cable fairing is attached.

13. A method of storing a cable fairing comprising:
providing cable fairing having a wing shaped cross section with a rounded front and a tapered tail, a through-going cable channel for the cable perpendicular to the cross section of the widest part of the cross section, where the wing profile comprises an elastic material with sufficient stiffness in order to maintain the shape when it is exposed to a flow resistance, wherein slits are cut through the resilient material from the tail towards the cable channel, so that the tail comprises slats separated by the slits and each slat can be independently bent parallel to the cable channel to reduce the cross-section of the cable fairing;
reducing the cross-section of the cable fairing by deforming an original shape of the cable fairing by bending at least one of the slats; and
allowing the cable fairing to resume the original shape.

14. The method according to claim 13, further comprising reeling the cable fairing onto a drum together with a cable to which the cable fairing is attached to reduce the cross-section of the cable fairing and unwiding the cable fairing from the drum to allow the cable fairing to resume the original shape.

* * * * *